Nov. 25, 1958  A. J. KOSCH ET AL  2,861,409
DOUBLE MOWER ASSEMBLY
Filed Oct. 18, 1956  5 Sheets-Sheet 5

INVENTORS,
ALOIS J. KOSCH,
MAX A. KOSCH,
BY Harold B. Hood,
ATTORNEY.

# 2,861,409਍਍DOUBLE MOWER ASSEMBLY

Alois J. Kosch and Max A. Kosch, Columbus, Nebr., assignors to Kosch Co., Columbus, Nebr., a corporation of Nebraska Application October 18, 1956, Serial No. 616,731

10 Claims. (Cl. 56—25)

The present invention relates to mowers and more particularly to a double mower assembly upon a farm tractor or similar automotive vehicle and to the specific details of a particular mower attachment unit.

A primary object of the invention is to provide a double mower assembly in which two mower units are mounted, in an optimum relation, upon a single automotive vehicle whereby to cut a double swath, during a single pass of the vehicle around a field, without missing and without "backing down" any portion of the crop as the assembly negotiates corners.

A further object of the invention is to provide a novel mower attachment for tractors or the like, including a mower frame, a lift bar supported from that frame and projecting to a substantial distance laterally from the frame, a mower assembly carried at the distal end of the lift bar, and means including a fluid motor for controlling the elevation of the distal end of the lift bar and of the cutter assembly carried thereby.

A still further object of the invention is to provide, in such an attachment, a tie bar of novel construction, capable of yieldingly maintaining the lift bar in a preselected angular position relative to the longitudinal axis of the mower frame.

A still further object of the invention is to provide a novel means, including a single-acting fluid motor and a double-acting spring assembly, for controlling the position of the lift bar and cutter assembly about a horizontal axis.

Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
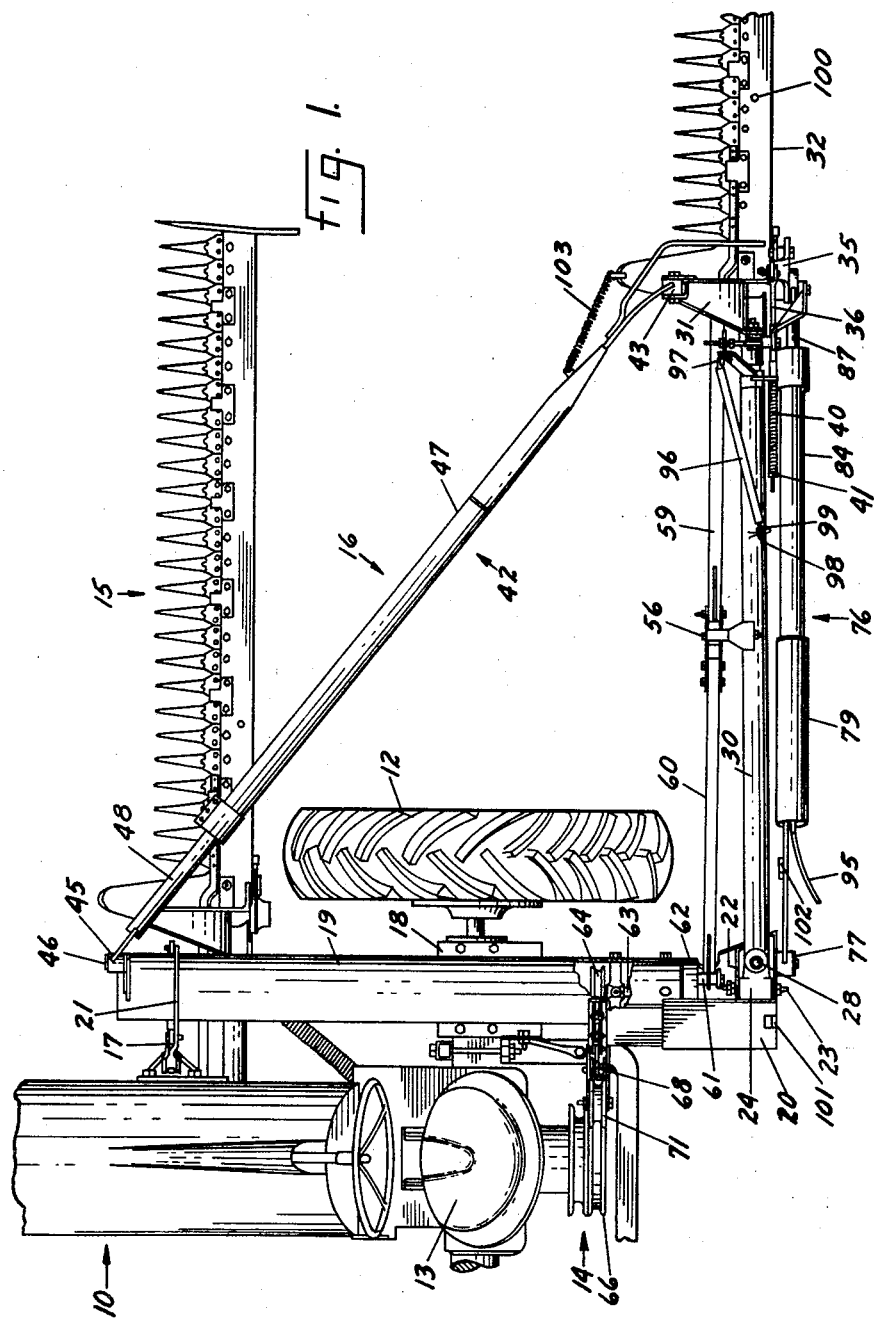
Fig. 1 is a plan view of our double mower assembly mounted on a tractor, shown fragmentarily.

In the drawings, we have suggested a conventional tractor, indicated generally by the reference numeral 10, and having front wheels 11 and rear wheels 12 driven from a prime mover (not shown) on the tractor. The operator's seat is indicated at 13, and a conventional power take-off, driven from the prime mover, is indicated generally by the reference numeral 14. A conventional mower unit 15, including a reciprocably mounted blade driven in any suitable fashion from the power take-off 14, is supported conventionally from the tractor frame with the cutter bar projecting laterally from one side of the tractor at a point between the front wheels 11 and the rear wheels 12 and quite close to the rear wheels. Our novel mower attachment is indicated generally by the reference numeral 16 and includes a cutter element or assembly 32 which, as is most clearly to be seen in Fig. 1, projects from the same side of the tractor but is positioned more remotely from the tractor so that the distal end of the unit 15 slightly laps the proximal end of the unit 32. The position of the unit 32 is spaced rearwardly from the wheels 12 a distance substantially equal to the distance by which the unit 15 is spaced forwardly of the wheels 12. Because of this particular relationship between the two cutter units, a clean cut may be made at the corner of a standing crop, with maximum facility. The operator drives the assembly along one edge of the crop until the mower unit 15 reaches the next adjacent edge of the crop. The tractor is then turned sharply to the right, whereby both mower units swing rearwardly. As the operator then begins to move the machine along the new edge of the crop, both mower units enter into the uncut area without skipping and without running down any of the crop.

Additionally, the particular relationship between the two mower units facilitates mowing in curves or on contours. With different relationships between the cutter units, the proximal end of the unit 32 will not satisfactorily "track" the distal end of the unit 15 when the machine rounds a curve; and if either unit is spaced too far either forward or behind the wheels 12, its cutter bar would sweep the crop at such an angle, during a curve or turn, that the points of the mower guards would run down at least a portion of the crop, without cutting.

The attachment of the present disclosure comprises bracket means 17 adapted to be suitably secured to the frame of the tractor 10 at a point spaced substantially forwardly from the rear wheels, but behind the front wheels 11, as indicated. Further bracket means 18 is adapted to be secured, in any suitable fashion, to the rear axle of the tractor. A mower frame unit 19 may preferably take the form of a long tube of relatively large diameter terminating, at its rearward end, in a box-like structure 20. Suitable means, such as a strap 21, is provided for securing the forward end of the frame 19 on the bracket means 17, and suitable means is likewise provided for securing the frame 19 to the bracket means 18.

Figure 7:
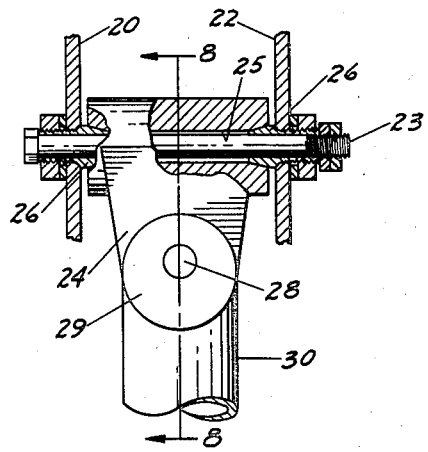
Fig. 7 is an enlarged, substantially horizontal plan view of the mounting for the proximal end of the lift bar, parts being shown in section.
Figure 8:
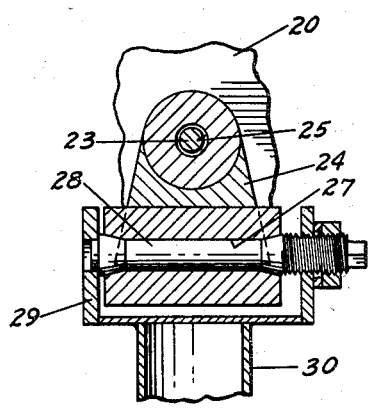
Fig. 8 is a section taken substantially on the line 8—8 of Fig. 7.

Within the box-like structure 20 of the frame 19 we provide means, such as a bracket 22 which, in conjunction with the frame wall, provides support for a journal pin 23 which passes through a bore 25 in a member 24, tapered trunnions 26, 26 being supported upon said pin to provide bearings upon which the member 24 is oscillably supported (see Fig. 7). The member 24 is formed with a second bore 27, disposed in a plane perpendicular to the plane including the axis of the bore 25; and a journal pin 28 is received in that bore and carries trunnions similar to the trunnions 26, said pin being fixed in bracket means 29 carried at one end of a lift or aft tie bar 30.

Figure 2:
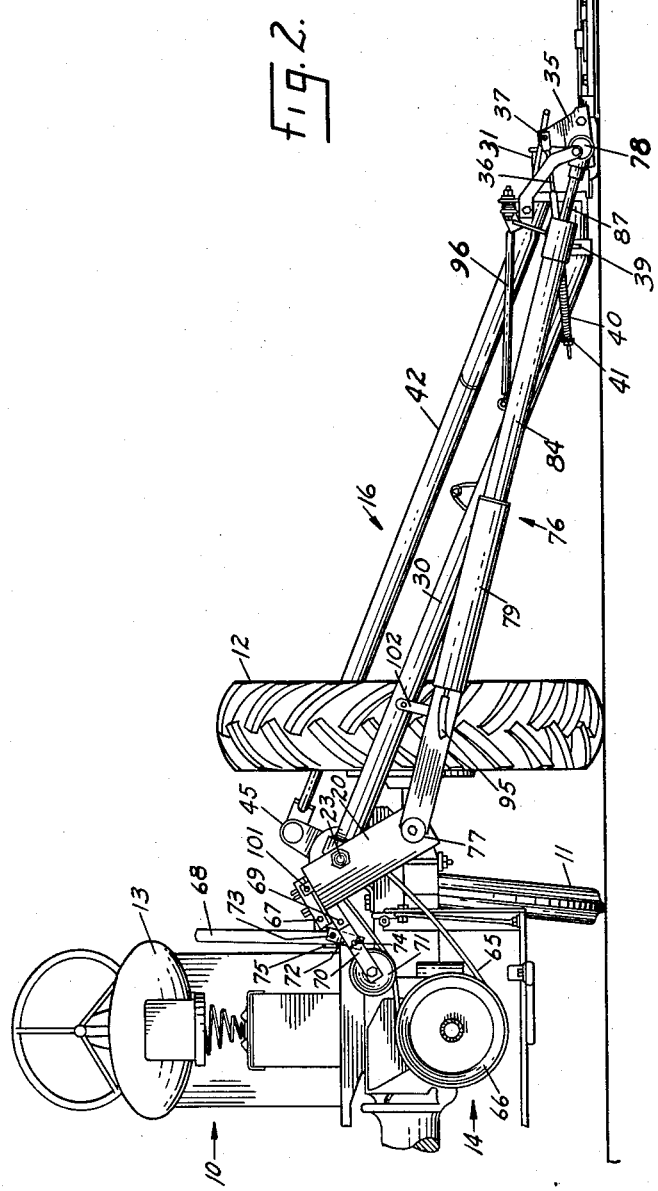
Fig. 2 is a rear elevation of the structure illustrated in Fig. 1.

As will be seen from an inspection of Fig. 1, the axis of the pin 23 is substantially horizontal while the axis of the pin 28 is inclined only slightly from the vertical when the lift bar 30 is in the cutting position of Figs. 1 and 2. Thus, the lift bar is mounted for swinging movement about the axis of the pin 23 and for oscillation about the axis of the pin 28.

At the distal end of the lift bar 30, there is mounted a yoke 31 (Figs. 1, 2 and 3) from which is supported the cutter assembly 32, said assembly being mounted for oscillation about aligned trunnion elements 33 and 34 carried by the yoke 31. A plate 35 is secured to the unit 32 and is formed with an upstanding arm to which one end of a rod 36 is pivotally secured as at 37. Said rod 36 projects through a key hole slot 38 in a plate 39 fixedly supported on the lift bar 30 and, beyond said plate, carries a spring 40 bearing against a nut 41 at the end of the rod. When the bar 32 is in the position of Figs. 1, 2 and 3, the reduced portion of the rod 36 rests in the lower portion of the slot 38 with the spring 40 bearing against the inner surface of the plate 39 and exerting a sustaining effect upon the cutter bar. That portion of the rod 36 nearer the plate 35 is of such diameter that it cannot pass through the lower portion of the slot 38, whereby the bar 32 is held against accidental elevation. When it is desired to swing the bar 32 in a counter-clockwise direction about its pivotal mounting, the inner end of the rod 36 is lifted to bring the enlarged portion of the rod into registry with the enlarged upper portion of the slot 38, whereupon said rod may pass through said slot.

A fore tie bar, indicated generally by the reference numeral 42, controls movement of the distal end of the lift bar 30 about the axis of the pin 28. As is most clearly shown in Figs. 1 and 3, one end of the tie bar is anchored to the yoke 31 by means of a pivot pin 43 mounted in a bracket 44 secured to said yoke. The other end of the tie bar is anchored on the mower frame 19 through the medium of a collar 45 secured to the tie bar and journal mounted on a stud 46 carried at the forward end of the frame upon an axis parallel with, but offset from, the axis of the pin 23.

Figure 5:
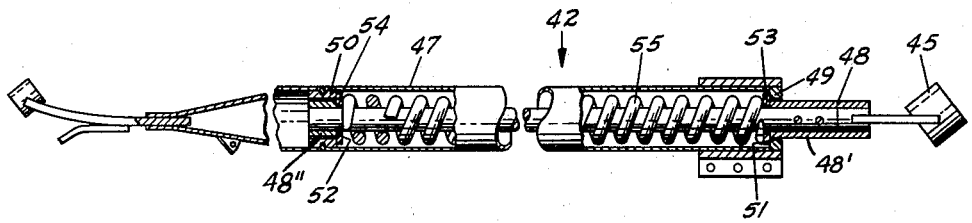
Fig. 5 is a longitudinal section through the novel tie bar of the present disclosure, drawn to an enlarged scale.

As is most clearly illustrated in Figs. 1 and 5, the tie bar 42 comprises a housing 47 and a stem 48 telescopically received therein. The housing 47 is provided with a first abutment 49 at its end remote from the anchor 43 and with a second abutment 50 intermediate its ends. The stem 48 includes two fixed sleeves 48' and 48" to provide a pair of spaced shoulders 51 and 52 and, in the illustrated embodiment of the tie bar, the shoulders 51 and 52 are spaced apart a distance equal to the distance between the abutments 49 and 50. A ring 53, loosely mounted on the stem 48, is so proportioned as to span the shoulder 51 and the abutment 49; and a second ring 54, loosely sleeved on the stem 48, spans the abutment 50 and the shoulder 52. A heavy coiled spring 55 is sleeved on the stem 48 within the housing 47 and is confined between the rings 53 and 54.

If, during operation of the mower assembly, the bar 32 should strike an obstruction as the assembly moves forward, it would tend to swing in a clockwise direction about the pivot pin 28 as viewed in Fig. 1. Any such tendency will cause the housing 47 to move, relative to the stem 48, toward the left as viewed in Fig. 5, whereby the abutment 49 will carry the ring 53 toward the left to compress the spring 55. In other words, the tie bar assembly will yieldably resist clockwise movement of the cutter bar 32 and lift bar 30 about the pivot pin 28; and, when the obstruction is cleared, expansion of the spring 55 will return the ring 53 and housing 47 to the condition illustrated in Fig. 5.

If, during rearward movement of the assembly, the bar 32 should strike an obstruction, it would tend to move in a counter-clockwise direction about the pivot pin 28. Such tendency would force the housing 47 toward the right, relative to the stem 48, as viewed in Fig. 5, whereby the abutment 50 will move the ring 54 toward the right to compress the spring 55. Thus, the tie bar will yieldably resist such counter-clockwise movement of the cutter bar and lift bar and, when the obstruction has been cleared, the spring 55 will again return the parts to the positions of Fig. 5.

Figure 3:
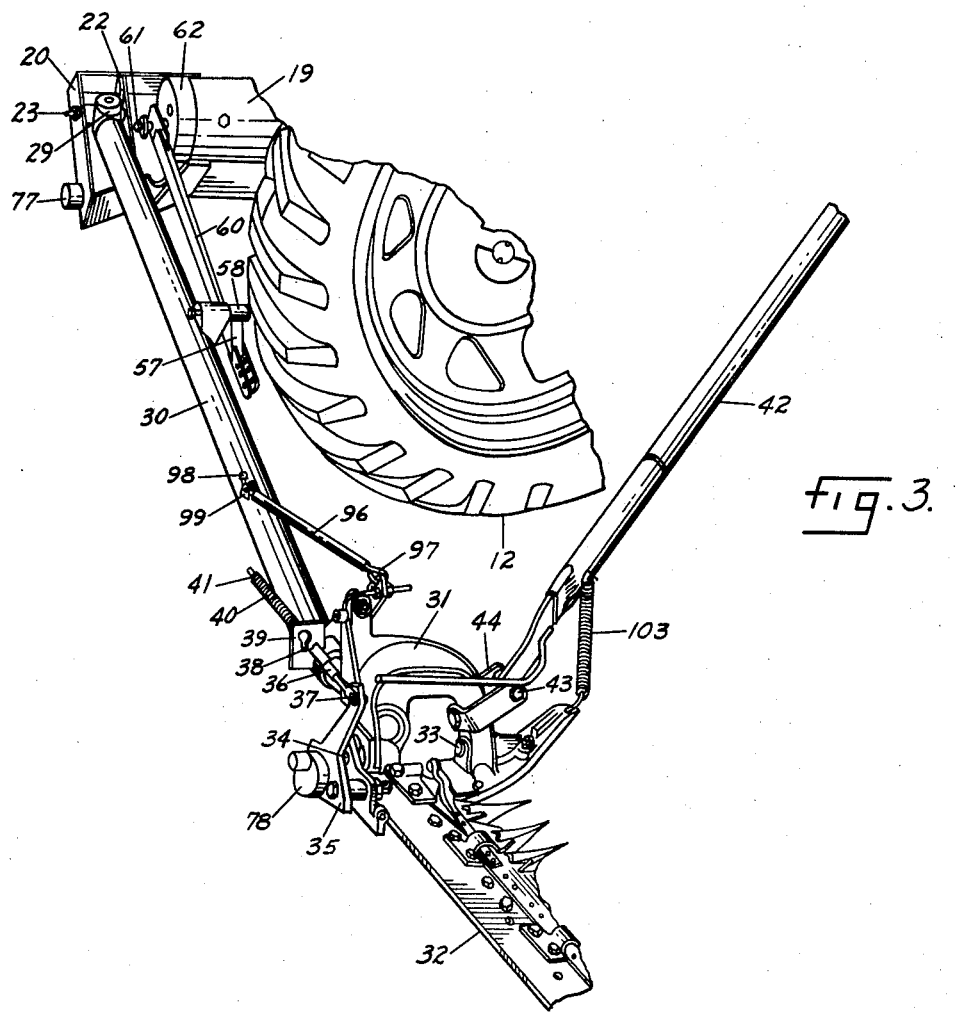
Fig. 3 is a fragmentary perspective view taken from a point near the distal end of the lift bar, certain parts being omitted for clarity of illustration.

Intermediate its end, the lift bar 30 carries a trunnion element 56 (Fig. 1) upon which is supported a lever 57 through the medium of a journal sleeve 58 (Fig. 3). A link 59 (Fig. 1) is connected at one end to the conventional, reciprocably mounted blade of the unit 32 and at its other end to the lever 57; and a pitman 60 is connected at one end to the lever 57 and at its opposite end to eccentric means 61 on a rotary element 62. The rotary element 62 is carried by a shaft 63 suitably journalled in the frame 19 and driven from a V-pulley 64. A belt 65 is loosely trained over the pulley 64 and over a pulley 66 of the power take-off 14 (Fig. 2).

We have provided means, readily manipulable from the operator's seat 13, for tightening the belt 65 to drive the pulley 64 of the blade-operating mechanism, or loosening that belt to discontinue the drive. As is most clearly shown in Figs. 1 and 2, that means comprises a first pivot 67 supported from the frame 19 and upon which is pivotally mounted a first lever 68. A second stationary pivot 69 supported from the frame 19 mounts a second lever 70 which carries, at its distal end, a roller 71 bearing upon the belt 65. A link 72 is pivotally connected at one end to an arm of the lever 68, as at 73; and the opposite end of said link is connected, by pivot means 74, to the lever 70 intermediate the ends thereof. In the position of the parts illustrated in Fig. 2, the belt is loose and will not drive the pulley 64; but when the lever 68 is moved in a counter-clockwise direction about its pivot 67, to shift the pivot point 73 into a position below the imaginary line joining the pivots 67 and 74, the roller 71 is thereby pressed more firmly against the belt 65 to tighten the same. In the latter position of the parts, the stop tab 75 engages the link 72 to hold the parts, after the above-described toggle action, in belt-tightening positions.

The position of the lift bar 30 about its axis 23 is controlled by an elongated power unit 76, the proximal end of which is journal mounted on a trunnion element 77 at the rear end of the frame 19, and the distal end of which is connected to a trunnion element 78 on the plate 35. As is most clearly illustrated in Fig. 6, the unit 76 comprises a single-acting fluid motor and a double-acting spring assembly somewhat similar to the spring assembly of the tie bar 42.

The fluid motor comprises a cylinder 79 having a port 80 at one end, having a floating piston 81 reciprocably mounted therein, and carrying at its opposite end a plug 82 formed with an axial bore 83 therethrough. The spring assembly comprises a housing 84 suitably secured in coaxial registry with the bore 83 and provided with an abutment 85 adjacent its opposite end. The outer end of the plug 82 comprises a second abutment 86 within the housing 84; and a stem 87 is telescopically mounted in the housing 84, projects from the outer end thereof, and penetrates the bore 83 to extend into the cylinder 79 with its inner end in proximity to the piston 81. A shoulder 88 is provided at the outer end of the stem 87, and a second shoulder 89 is provided at the inner end thereof. Ring means 90 is loosely sleeved on the stem 87 adjacent the abutment 85 and a sleeve 91 constitutes spacer means between said ring means and the shoulder 88. A similar ring means 92 is loosely mounted on the stem 87 adjacent the abutment 86, and a sleeve 93 constitutes spacer means between the ring 92 and the shoulder 89. A heavy coiled spring 94 is sleeved on the stem 87 within the housing 84 and is confined between the rings 90 and 92.

Figure 4:
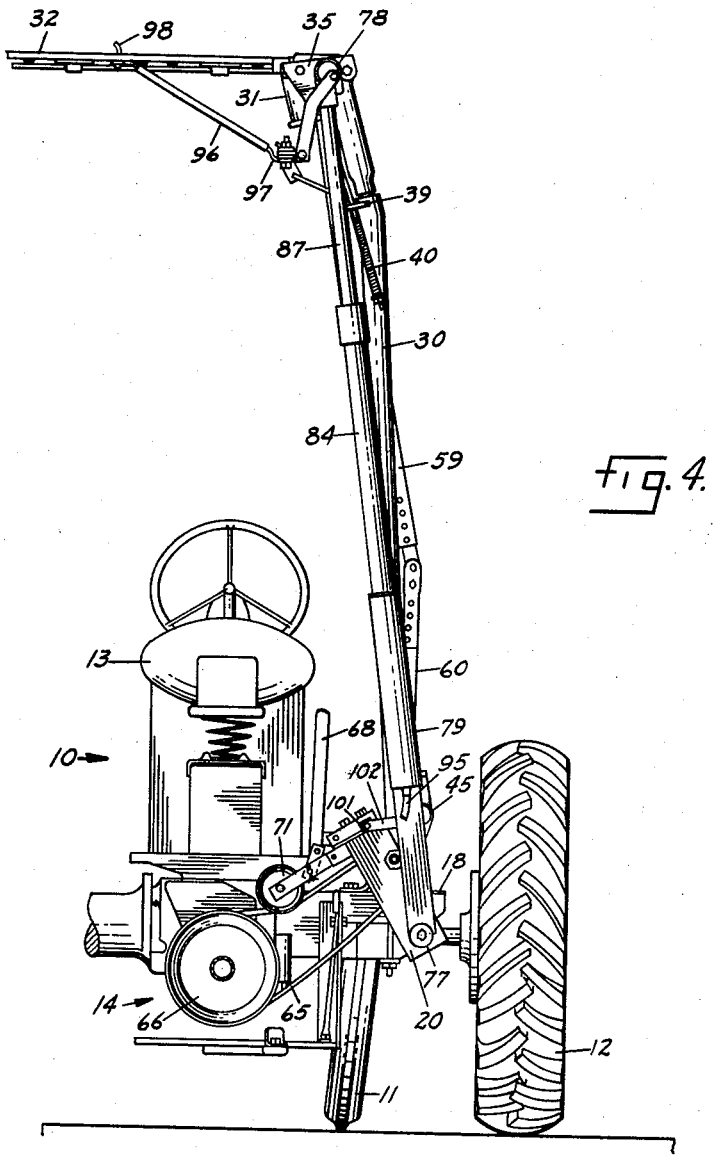
Fig. 4 is a rear elevation of the assembly, with the rear mower unit elevated to transit position.
Figure 6:
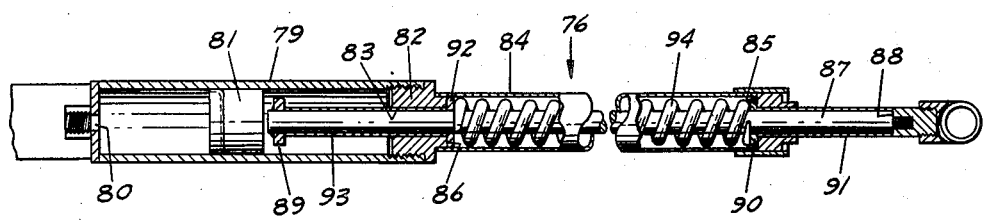
Fig. 6 is a similar enlarged section of the fluid motor and spring assembly.

The parts are so proportioned and designed that the condition illustrated in Fig. 6 will obtain when the lift bar 30 is substantially midway between the positions illustrated in Fig. 2 and in Fig. 4, respectively. As the lift bar moves from such intermediate position toward the position of Fig. 2, the stem 87 will be moved toward the left, as viewed in Fig. 6, whereby the ring 90 will be correspondingly moved to compress the spring 94. Thus, in the position of Fig. 2, the mower assembly is resiliently supported by the spring 94; and the parts are so proportioned and designed that, normally, the cutter bar 32 will thus be supported just above the ground level. If stubble is to be left in the field, fluid under pressure will be supplied to the cylinder 79, through the port 80, which is connected to the conventional hydraulic pump present in most farm tractors, through a flexible hose 95. As fluid is so supplied to the cylinder 79, the piston 81 will be moved toward the right, thereby adding its effect to the tendency of the spring 94 to lift the distal end of the bar 30 to any desired degree, whereafter the supply of fluid to the cylinder 79 is shut off by valve means which seals a predetermined volume of fluid in the cylinder to hold the piston (and thereby the stem 87) against retrograde movement.

During such movement of the lift bar, of course, the unit 76 will swing about the trunnion means 77, and the unit 42 will swing about the trunnion means 46.

During operation in any such partially-elevated condition of the lift bar 30, the cutter bar 32 will be maintained in a substantially horizontal plane by the spring 40 and an auxiliary spring 103, seen in Figs. 1 and 3.

When it is desired to move the machine through any substantial distance without operation of the mower unit 32, the assembly may be shifted to the position of Fig. 4. To that end, the rod 36 is lifted, as above-described, and the cutter bar 32 is manually swung, about its trunnion means 33, 34, to a position substantially perpendicular to the lift bar 30. A tie rod 96 is anchored at one end, through the medium of a hook 97, to an element fixed with respect to the yoke 31; and said rod carries, at its opposite end, a fastener bolt 98 which normally rests in a bracket 99 carried on the lift bar. After the cutter bar 32 has been moved to its above-mentioned position, the tie rod 96 will be shifted to the position illustrated in Fig. 4, and the bolt 98 will be passed through a perforation 100 (Fig. 1) in the cutter bar 32 and will be secured therein by any suitable means to hold the cutter bar in its new position.

A bracket 101 is fixed to the frame 19 and a finger 102 is carried upon the unit 76, these parts being so arranged that, when the lift bar 30 reaches the position of Fig. 4, perforations in the bracket 101 and in the finger 102 will come into registry. It will be perceived that the assembly may be moved from the position of Fig. 2 to the position of Fig. 4 through operation of the fluid motor to project the stem 87 to the limit of its movement. Thus, as fluid under pressure is supplied to the cylinder 79, the piston 81 is moved toward the right as viewed in Fig. 6 to force the stem 87 outwardly. As has been stated, the ring means 90 will come into engagement with the abutment 85 when the lift bar 30 attains a position about midway between the positions of Figs. 2 and 4; and thereafter, further outward movement of the stem 87 will carry with it the ring 92, whereby the spring 94 will be again compressed. When the parts attain the position of Fig. 4, the spring 94 will have been very substantially compressed; and the parts are so proportioned and designed that, although the cutter assembly is considerably overbalanced toward the left as viewed in Fig. 4, the force of the compressed spring 94 is sufficient to overcome the gravity effect and to swing the assembly in a clockwise direction about its several journal mountings. If desired, the parts may be maintained in the position of Fig. 4 by entrapping motive fluid in the cylinder 79; but preferably, the parts will be locked in the position of Fig. 4 by means of a bolt passing through the registering perforations in the bracket 101 and finger 102, whereafter pressure fluid may be released from the cylinder 79 and returned to the conventional reservoir.

When it is desired to return the parts from the position of Fig. 4 to the position of Fig. 2, pressure fluid will again be supplied to the cylinder 79 to balance the effect of the spring 94, whereafter the bolt may readily be withdrawn from the bracket and finger and, by controllably releasing pressure fluid from the cylinder 79, the assembly will be returned, under control, to the position of Fig. 2. As the assembly so returns, the ring 92 will move toward the left until it engages the abutment 86, at an intermediate position of the parts, and thereafter, the ring 90 will move toward the left to compress the spring 94, as the assembly moves down to normal cutting position.

It is to be noted that, if desired, the lift bar 30 could be swung to the position of Fig. 4 without preliminarily folding the cutter bar to the position illustrated in that figure; and that, by properly adjusting the spring 40, it would be possible to use the cutter bar 32 in a substantially vertical plane, to prune trees.

We claim as our invention:

1. A resiliently expansible and contractible tie bar comprising a housing element and a stem element telescopically protruding from one end of said housing element, a first abutment in said housing element adjacent said one end thereof, a second abutment in said housing element nearer the other end thereof, a first shoulder and a second shoulder on said stem element, said shoulders being axially spaced by a distance substantially equal to the distance between said abutments, ring means loosely sleeved on said stem element adjacent each shoulder, each ring means being proportioned and designed to span its associated shoulder and the adjacent abutment, and coiled spring means sleeved on said stem element within said housing element and confined between said ring means.

2. A mower unit for attachment to a tractor comprising a mower frame element, means for securing said mower frame element to a tractor with the longitudinal axis of said frame element substantially parallel with the axis of such tractor, a lift bar, means carried near the rearward end of said mower frame and providing a pivotal mounting, upon an axis substantially parallel with said frame axis, for the proximal end of said lift bar, a cutter bar assembly supported from the distal end of said lift bar, trunnion means supported from said mower frame element near the rearward end thereof and disposed upon an axis generally below and parallel with the axis of said pivotal mounting, and a fluid motor comprising a cylinder member and a stem member telescopically associated with said cylinder member, means for resiliently holding said cylinder member and said stem member in a predetermined position relative to one another, one of said motor members being journal mounted on said trunnion means and the other of said motor members being operatively connected to the distal end of said lift bar, whereby operation of said fluid motor to force said stem member outwardly relative to said cylinder member will lift the distal end of said lift bar.

3. The mower unit of claim 2 including belt means operatively connected to drive said cutter bar assembly, and means for tightening and loosening said belt means to establish or disestablish a drive to said cutter bar assembly, said last-named means comprising a first pivot supported from said mower frame, a lever supported from said first pivot and having arms projecting oppositely from said pivot, a second pivot supported from said mower frame upon an axis parallel with, but offset from, the axis of said first pivot, a second lever having one end pivotally supported from said second pivot, a roller carried at the opposite end of said second lever and bearing on said belt means, and a link having one end pivotally connected to one arm of said first-named lever and having its opposite end pivotally connected to said second lever intermediate the ends thereof, said first named lever being shiftable to move the pivotal connection between said first-named lever and said link across the imaginary line joining said first pivot and the point of pivotal connection of said link with said second lever.

4. A mower unit comprising a mobile frame, a cutter element spaced laterally from said frame, fore and aft tie bars connected to said cutter and pivotally connected, each upon a substantially fore-and-aft axis, to fore and aft spaced points on said frame, an elongated power unit connected to said cutter and pivotally connected, upon a substantially fore-and-aft axis, to said frame at a point below that at which at least one of said first-mentioned tie bars is connected to said frame, whereby said tie bars, carrying said cutter, may swing between a first position in which said cutter is laterally spaced from and below said axes and a second position in which said cutter is substantially vertically above said axes, said power unit including extensible portions and resilient means operatively associated with said portions, said resilient means being in equilibrium when said tie bars are in one position intermediate said first and second positions, urging extension of said portions when said tie bars are between said one position and said first position and urging collapse of said portions when said tie bars are between said one position and said second position.

5. A mower unit comprising a mobile frame, a cutter element spaced laterally from said frame, fore and aft tie bars connected to said cutter and pivotally connected, each upon a substantially vertical axis, to fore and aft spaced points on said frame, said fore tie bar comprising a pair of telescopically-associated members, and spring means operatively associated with both of said members and resiliently resisting extension and contraction of said fore tie bar from a condition in which said fore tie bar retains said aft tie bar substantially perpendicular to a line joining the points of connection of said fore and aft tie bars to said frame.

6. A mower unit comprising a mobile frame, a cutter element spaced laterally from said frame, fore and aft tie bars connected to said cutter and pivotally connected, each upon a substantially fore-and-aft axis and upon a substantially vertical axis, to fore and aft spaced points on said frame, an elongated power unit connected to said cutter and pivotally connected, upon a substantially fore-and-aft axis, to said frame at a point below that at which at least one of said tie bars is connected to said frame, whereby said tie bars, carrying said cutter, may swing between a first position in which said cutter is laterally spaced from and below said fore-and-aft axes and a second position in which said cutter is substantially vertically above said fore-and-aft axes, said power unit including extensible portions and resilient means operatively associated with said portions, said resilient means being in equilibrium when said tie bars are in one position intermediate said first and second positions, urging extension of said portions when said tie bars are between said one position and said first position and urging collapse of said portions when said tie bars are between said one position and said second position, said fore tie bar comprising a pair of telescopically-associated members, and spring means operatively associated with both of said members and resiliently resisting extension and contraction of said fore tie bar from a condition in which said fore tie bar retains said aft tie bar substantially perpendicular to a line joining the points of connection of said fore and aft tie bars to said frame.

7. The mower unit of claim 5 in which said telescopically-associated members are a housing element and a stem element telescopically protruding from one end of said housing element, a first abutment in said housing element adjacent said one end thereof, a second abutment in said housing element nearer the other end thereof, a first shoulder and a second shoulder on said stem element, said shoulders being axially spaced by a distance substantially equal to the distance between said abutments, ring means loosely sleeved on said stem element adjacent each shoulder, each ring means being proportioned and designed to span its associated shoulder and the adjacent abutment, and said spring means is coiled spring means sleeved on said stem element within said housing element and confined between said ring means.

8. The mower unit of claim 4 in which said extensible portions of said power unit comprise a cylinder having the recited connection to said frame and a stem slidably received in, and projecting from, the end of said cylinder remote from said frame and having the recited connection to said cutter, a piston reciprocable within said cylinder and operatively associated with said stem to urge said stem outwardly away from said frame, said cylinder being provided with supply and exhaust port means adjacent its frame-connected end.

9. The mower unit of claim 8 including a plug having an axial bore seated in said remote cylinder end, a housing coaxial with said cylinder, registering with said plug bore and projecting beyond said remote cylinder end, a first fixed abutment near the distal end of said housing and a second fixed abutment near the proximal end of said housing, said stem penetrating said plug bore, traversing the length of said housing and projecting from the distal end thereof, a first shoulder and a second shoulder on said stem, a ring loosely sleeved on said stem within said housing adjacent each abutment, said resilient means comprising a coiled spring within said housing, confined between said rings and resiliently urging said rings toward engagement with their associated abutments, and means establishing a one-way operative connection between each shoulder and the ring adjacent thereto.

10. A mower unit comprising a mobile frame, a cutter element spaced laterally from said frame, fore and aft extensible and contractible connector devices connected to said cutter and to fore and aft spaced points on said frame, each of said connector devices including aligned, relatively-axially-movable elements and a coiled spring operatively associated between said elements, and means providing an operative connection between said spring and said elements such that, upon relative movement of said elements from an intermediate position toward either extension or contraction, said spring will be compressed.

References Cited in the file of this patent

UNITED STATES PATENTS

| | | |
|---|---|---|
| 1,358,351 | Wheeler | Nov. 9, 1920 |
| 2,150,350 | Vargas | Mar. 14, 1939 |
| 2,291,987 | Rogers | Aug. 4, 1942 |
| 2,643,109 | Wood | June 23, 1953 |
| 2,772,085 | Dodge | Nov. 27, 1956 |
| 2,775,855 | Richey | Jan. 1, 1957 |
| 2,783,039 | Wilson | Feb. 26, 1957 |
| 2,786,319 | Happe et al. | Mar. 26, 1957 |